United States Patent Office 2,750,275
Patented June 12, 1956

2,750,275

METHOD OF TREATING MATERIALS CONTAINING SULPHIDES

Orville John Parker, Kalgoorlie, Western Australia, Australia

No Drawing. Application March 24, 1952, Serial No. 278,303

4 Claims. (Cl. 75—9)

This invention relates to improvements in the treatment of materials containing sulphides.

More particularly, the invention concerns a process for the treatment of sulphide ores and concentrates for the production of elemental sulphur and metallic oxides or metals.

A primary application of the process is to the treatment of ores or concentrates containing simple or complex sulphides of iron to produce elemental sulphur and iron oxide which can be further treated either for the production of metallic iron or for the obtainment of other metallic contents. Thus, by way of example, the process can be used for the treatment of iron pyrites to obtain elemental sulphur and metallic iron. Auriferous pyritic concentrates can similarly be treated for the obtainment of elemental sulphur and the recovery of gold from the substantially sulphur-free calcines, or even for the recovery of elemental sulphur, metallic iron, and gold.

Heretofore the treatment of sulphide ores or concentrates for the production of elemental sulphur on an industrial scale has resulted in a yield in elemental form of less than half of the total sulphur present unless a reducing agent such as coke were used. Even when a reducing agent is used, the yield of elemental sulphur is less than 55% of the total sulphur present unless further separate treatment by catalysis of the gases evolved is carried out. The reason for the low yield of elemental sulphur in existing treatments not involving the use of a reducing agent and most usually taking the form of controlled roasting to check the oxidation of the thermally dissociated sulphur is that it has not been found possible with known techniques and equipment to prevent evolution of the greater part of the sulphur as sulphur dioxide rather than as the desired elemental sulphur. When a reducing agent such as coke is used, the treatment of the sulphides takes the form of a smelting operation in which a large portion of the sulphide is necessarily oxidized to the greatest extent by air and then rapidly slagged at high temperature with suitable fluxes, the valuable portion of the sulphide is concentrated in a matte with a part of the sulphur, a further and large part of the sulphur is oxidized in the oxidizing zone to produce as much sulphur dioxide as possible for the benefit of the smelt and subsequently partly reduced to elemental sulphur by the coke and carbon monoxide in the superimposed reducing zone, and a large part of the sulphur is distilled from the sulphides as elemental sulphur in the reducing zone where its oxidation to sulphur dioxide is prevented by lack of oxygen. However, reactions take place between sulphur vapour and carbon to form carbon disulphide and to a lesser extent between sulphur vapour and carbon monoxide to form carbonyl sulphide and therefore while the amount of sulphur dioxide in the evolved gases is considerably reduced, the proportion of elemental sulphur is only slightly increased by the use of the coke as a reducing agent under the conditions obtaining in the practice of this treatment and it is therefore necessary, if a high yield of elemental sulphur is to be obtained, to subject the evolved gases to subsequent catalysis to promote reaction between the sulphur dioxide and the sulphur-carbon and sulphur-oxygen-carbon compounds to produce carbon dioxide and some further elemental sulphur.

One of the chief objects of this invention is to obtain a high yield of elemental sulphur by carrying out a partial oxidation of the sulphides under conditions such that a controlled amount of sulphur dioxide produced is reduced to elemental sulphur by the sulphides or subsulphides in the reaction zone.

If according to this invention a reducing agent such as a carbonaceous substance is used either for the reduction of metallic oxides to metal or to supplement or in the case of treating a monosulphide to supplant the reducing action of the sulphides or subsulphides on sulphur dioxide the reactions of sulphur vapour with carbon and to a lesser extent with carbon monoxide that in known processes reduce considerably the yield of elemental sulphur are avoided or countered because according to this invention the required temperature is controlled above the dissociation temperature of carbon disulphide and any tendency for sulphur to combine with carbon to form carbon disulphide or with carbon monoxide to form carbonyl sulphide is countered by concurrent catalysis by the metallic oxides present in the reaction zone and which in this process are not fused, slagged, sintered or melted and are therefore available to cause reaction between sulphur dioxide and any carbon disulphide or carbonyl sulphide that may be formed to give elemental sulphur and carbon dioxide.

In many applications of the invention it is desirable to carry out the process in two steps comprising for instance a controlled oxidation of the sulphides and the production of elemental sulphur and metallic oxides in the first step and the reduction of the metallic oxides to metal in a separate second step by a carbonaceous substance.

In other applications, further oxidation of the solid products of the first step may be carried out in the second step to render them suitable for a subsequent treatment such as for cyanidation treatment for the recovery of gold.

In the following the process is for convenience described as applied to the treatment of iron pyrites.

The basis of the process consists in the partial oxidation of pyrites sufficient only to produce magnetite and elemental sulphur and controlling temperature within such limits as to promote the intermediate reaction:

(1) $$3FeS + 2SO_2 = Fe_3O_4 + 2.\tfrac{1}{2}S_2$$

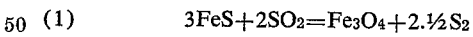

which ensures that a high proportion of the total sulphur content of the material treated is evolved in elemental form.

The process may be carried out in apparatus in which the pyrites and the gases move counterflow to each other, as for instance in a vertical shaft furnace or in a rotary kiln, or they may be carried out by the use of the fluidized bed principle.

When the process is carried out with the pyrites and the gases moving counterflow to each other and the conditions are maintained appropriate for the reactions to proceed to substantial completion, approximately half of the sulphur is evolved in elemental form by thermal dissociation of the pyrites. The remainder of the sulphur is evolved in elemental form by reaction of $SO_2$ with part of the resulting FeS in accordance with Reaction 1, the $SO_2$ being formed by oxidation of the remaining FeS with the oxygen supplied in accordance with the reaction:

(2) $$3FeS + 5O_2 = Fe_3O_4 + 3SO_2$$

Because of the rapid random movement of the solid particles when the fluidized bed principle is used, some of the elemental sulphur evolved by thermal dissociation of the pyrites will be oxidized to $SO_2$ in those portions of the bed containing sufficient oxygen and this $SO_2$ will be reduced to sulphur again by FeS in accordance with Reaction 1.

By either method of operation there are therefore obtained two products, magnetite and elemental sulphur, the latter in the form of vapour diluted with inert nitrogen if air is used for oxidation.

A still further stage of the process will be to interact the magnetite with carbon so as to obtain the following reaction:

(3) $\qquad Fe_3O_4 + 3C = 3Fe + 2CO + CO_2$

Alternatively the magnetite may be further oxidized as in the following reaction to obtain a calcine amenable to treatment by cyanidation for recovery of precious metals:

(4) $\qquad 4\ Fe_3O_4 + O_2 = 6Fe_2O_3$

The utility of the processes will be apparent, particularly as far as it concerns the recovery of elemental sulphur. This material has an enormous use in the production of sulphuric acid, and this manufacture is much simplified when sulphur is the raw material used for the production of the sulphur oxides.

Actually, it has been found that the processes outlined are very satisfactorily carried out by the use of the fluidized bed principle, the violent agitation and mixing with high velocity gases causing frequent contact of molecules of $SO_2$ and FeS, for example, thus accelerating their reaction.

When the process is carried out in two steps there are two chambers employed in which there are fluid beds. The first two reactions previously referred to are carried out in the first bed, and the third or the fourth reaction in the second bed. More specifically, pyrites is fed continuously to the first chamber and sufficient oxygen is introduced below the constriction plate to supply oxygen equivalent to the requirements of the second reaction previously referred to. The oxygen containing gas used is of course sufficient to maintain the bed in a state of vigorous action.

Thermal dissociation of the loose atom of the pyrite takes place and part of the FeS so formed together with some of the thermally dissociated sulphur is oxidized, the sulphur dioxide so formed being reduced by the remaining FeS to give magnetite and further elemental sulphur. The fluidized magnetite overflows into the second chamber.

The conditions necessary to carry out the reactions referred to are carefully maintained in the first chamber, such conditions being the supply of sufficient oxygen containing gas to provide the amount of oxygen required for reaction, the supply of sufficient additional inert gas if necessary to maintain the bed fluid and the control of the temperature of the reaction below the sintering temperature of the bed but sufficiently high for the effective reduction of sulphur dioxide by ferrous sulphide in the time available and under the conditions obtaining within the reaction chamber.

Investigations have shown that the reduction of sulphur dioxide by ferrous sulphide starts below 700° C. and that the reaction is rapid and complete at 900° C. Ferrous sulphide fuses at approximately 1200° C. and magnetite at 1500° C., but fluxing impurities in the feed may cause partial fusion and sintering at temperatures as low as 1000° C. It has been found that the operation of the fluid bed is satisfactory at temperatures up to 980° C. and that at temperatures in the range 800° C. to 950° C. the reduction reaction proceeds sufficiently rapidly under the conditions obtaining in a fluidized bed to give substantially complete reduction in a chamber of economic size.

With dry pyritic feed containing 40% of sulphur, that is pyrite diluted with some inert material as is invariably the case in actual industrial operations, and sufficient oxygen but no more than required for the reactions previously referred to, the exothermic heat of reaction is sufficient to maintain the reaction at a temperature of 900° C. and provide additionally approximately 12% of the heat of reaction to replace heat lost through the walls of the reaction chamber.

Depending on the scale of operation, the heat losses and the nature of the material being treated, so the temperature may be controlled within the limits found most suitable by varying the proportion of sulphide in the material or by varying the proportion of oxygen in the fluidizing gas or by preheating the material or the gas or by varying addition of combustible substance to the material or to the fluidizing gas or by the reduction of the amount of moisture in or addition of water to the material or by applying or withdrawing or preventing the escape of heat or by a combination of any or all of these means.

When a combustible substance is added to the reaction, sufficient air or oxygen containing gas additional to that required for the reactions previously referred to must of course be supplied for the combustion of this substance. In some cases it may be more economic or desirable to combust some of the elemental sulphur with additional air or oxygen containing gas rather than add a combustible substance, but this can only be done at the expense of a lower yield of elemental sulphur.

The fluidized magnetite which overflows into the second chamber may either be reduced or be further oxidized by reactions previously described. Thus the bed in the second chamber may be fluidized with an oxydizing gas or a reducing gas or both together with sufficient solid carbon or carbonaceous material for the reduction of the magnetite to sponge-iron and for the additional combustion of some of such carbon to maintain the reaction temperature at from 850° C. to 1000° C., the fluidized sponge iron overflowing the fluid bed for subsequent treatment to obtain the coherent metal.

Alternatively the bed in the second chamber may be fluidized by an oxydizing gas to oxidize the magnetite to hematite for subsequent treatment for recovery of precious metals as previously described.

It will be obvious that the exit gases from the first chamber will require treatment because they contain the vaporized sulphur and magnetite dust. These gases are sent to a cyclone and then to a hot electrostatic precipitator both operating above the boiling point of sulphur and after this the dust free gases pass to a second electrostatic precipitator operating below the boiling point of sulphur, where the sulphur is separated from the gases and recovered in liquid or solid form.

A space is provided above the fluid bed in the first chamber sufficient to ensure that reaction between suspended particles and gas is complete before either leaves the chamber so that the dust separated from the bases in the cyclone and first electrostatic precipitator may pass to the second chamber and there join the overflow material from the bed of the first chamber. Likewise the space provided above the bed of the second chamber is sufficiently large to ensure that the dust from this chamber is also completely reacted so that when collected in any suitable apparatus, it may join the overflow from the bed of this chamber.

I claim:

1. An improvement in processes for the treatment of material containing sulphides consisting in imparting a rapidly mixing movement to a bed of confined subdivided solids, passing into said bed with intimate contact therein the material to be treated in subdivided solid form, and an oxidizing gas at such relative rates that the oxygen supplied by the gas is equivalent to that which can be substantially completely absorbed under the conditions maintained above said bed by combination with the oxidizable components of the material other than its sulphur content, providing a space above said bed within which to complete the reaction with the gas of dust lifted from the bed thereby, maintaining above the bed a temperature sufficient to cause monosulphides, either originally present in the material or formed therefrom within the area of confinement by distillation of the labile sulphur, to reduce substantially completely to elemental sulphur sulphur dioxide formed by reaction of the material with the oxidizing gas but insufficient to fuse, slag, sinter or melt any of the products of reaction, removing the reacted subdivided solids from said bed, removing the gases from the upper part of the area of confinement, freeing the removed gases at a temperature above the condensation temperature of the sulphur therein of entrained solids, and thereafter condensing and collecting the sulphur from the gases.

2. An improvement in processes for the treatment of material containing sulphides consisting in imparting a rapidly mixing movement to subdivided solids, passing into said bed with intimate contact therein the material in subdivided solid form, a combustible carbonaceous substance, and an oxidizing gas at such relative rates that the oxygen supplied by the gas is equivalent to that which can be substantially completely absorbed under the conditions maintained in the area of confinement by combination with the oxidizable components of the bed other than its sulphur content, providing a space in said area of confinement within which to complete the reaction with the gas of dust lifted from the bed thereby, maintaining within said area a temperature sufficient to cause monosulphides, either originally present in the material or formed therefrom within said area by distillation of the labile sulphur, to reduce substantially completely to elemental sulphur sulphur dioxide formed by reaction of the material with the oxidizing gas but insufficient to fuse, slag, sinter or melt any of the products of reaction, removing the reacted subdivided solids from said bed, removing the gases from the upper part of said area, freeing the removed gases at a temperature above the condensation temperature of the sulphur therein of entrained solids, and thereafter condensing and collecting the sulphur from the gases.

3. An improvement in processes for the treatment of material containing sulphides consisting in imparting a rapidly mixing movement to a bed of confined subdivided solids, passing into the bed with intimate contact therein the material to be treated in subdivided solid form, and an oxidizing gas at such relative rates that the oxygen supplied by the gas is equivalent to that which can be substantially completely absorbed under the conditions maintained in the area of confinement by combination with the oxidizable components of the material other than its sulphur content, providing a space in said area within which to complete the reaction with the gas of dust lifted from said bed thereby, maintaining within said area a temperature sufficient to cause monosulphides, either originally present in the material or formed therefrom within said area by distillation of the labile sulphur, to reduce substantially completely to elemental sulphur sulphur dioxide formed by reaction of the material with the oxidizing gas but insufficient to fuse, slag, sinter or melt any of the products of reaction, removing reacted subdivided solids from said bed, removing the gases from the upper part of said area, freeing the removed gases at a temperature above the condensation temperature of the sulphur therein of entrained solids, condensing and collecting the sulphur from the gases, passing the reacted solids to a further confined bed of material having a rapid mixing movement, passing into said second bed with intimate contact therein an oxidizing gas whereby the solid products are further oxidized and thereby rendered more suitable for cyanidation treatment for the recovery of gold.

4. An improvement in processes for the treatment of material containing sulphides consisting in imparting a rapidly mixing movement to a bed of confined subdivided solids, passing into said bed with intimate contact therein the material to be treated in subdivided solid form, and an oxidizing gas at such relative rates that the oxygen supplied by the gas is equivalent to that which can be substantially completely absorbed under the conditions maintained in the area of confinement by combination with the oxidizable compoents of the material other than its sulphur content, providing a space in said area within which to complete the reaction with the gas of dust lifted from the bed thereby, maintaining within said area a temperature sufficient to cause monosulphides, either originally present in the material or formed therefrom within said area by distillation of the labile sulphur, to reduce substantially completely to elemental sulphur sulphur dioxide formed by reaction of the material with the oxidizing gas but insufficient to fuse, slag, sinter or melt any of the products of reaction, removing from said area the reacted subdivided solids from said bed, removing the gases from the upper part of said area, freeing the removed gases at a temperature above the condensation temperature of the sulphur therein of entrained solids, condensing and collecting the sulphur from the gases, passing the desulphurized solids to a bed having a rapid mixing movement in a further confined area where sufficiently reducing conditions are maintained to reduce the desulphurized material to the metallic state.

References Cited in the file of this patent

UNITED STATES PATENTS

| | | |
|---|---|---|
| 866,580 | Davis | Sept. 17, 1907 |
| 1,941,592 | Bacon et al. | Jan. 2, 1934 |
| 1,969,021 | Lenander | Aug. 7, 1934 |
| 1,969,264 | Grant | Aug. 7, 1934 |
| 2,009,733 | Hechenbleikner | July 30, 1935 |
| 2,058,480 | McCallum et al. | Oct. 27, 1936 |
| 2,184,300 | Hodson et al. | Dec. 26, 1939 |
| 2,282,124 | Fahrenwald | May 5, 1942 |

FOREIGN PATENTS

| | | |
|---|---|---|
| 359,478 | Great Britain | Oct. 16, 1931 |